(12) United States Patent
Khan

(10) Patent No.: US 8,625,183 B2
(45) Date of Patent: Jan. 7, 2014

(54) THREE DIMENSIONAL HOLOGRAPHIC VOLUMETRIC DISPLAY

(76) Inventor: Javid Khan, Edinburgh (GB)

( * ) Notice: Subject to any disclaimer, the term of this patent is extended or adjusted under 35 U.S.C. 154(b) by 251 days.

(21) Appl. No.: 12/736,021

(22) PCT Filed: Mar. 5, 2009

(86) PCT No.: PCT/GB2009/050224
§ 371 (c)(1),
(2), (4) Date: Sep. 2, 2010

(87) PCT Pub. No.: WO2009/109785
PCT Pub. Date: Sep. 11, 2009

(65) Prior Publication Data
US 2011/0002020 A1 Jan. 6, 2011

(30) Foreign Application Priority Data

Mar. 7, 2008 (GB) .................................. 0804280.6
Mar. 10, 2008 (GB) .................................. 0804383.8

(51) Int. Cl.
*G03H 1/26* (2006.01)
*G03H 1/30* (2006.01)

(52) U.S. Cl.
USPC ............................................. 359/22; 359/25

(58) Field of Classification Search
USPC ................................................... 359/22, 25
See application file for complete search history.

(56) References Cited

U.S. PATENT DOCUMENTS

| | | | |
|---|---|---|---|
| 4,795,223 A | 1/1989 | Moss | |
| 5,191,449 A | 3/1993 | Newswanger | |
| 5,973,807 A | 10/1999 | Buchkremer et al. | |
| 6,127,066 A * | 10/2000 | Ueda et al. | 430/1 |
| 7,324,248 B2 * | 1/2008 | Brotherton-Ratcliffe et al. | 359/22 |
| 2004/0212550 A1 * | 10/2004 | He | 345/6 |
| 2007/0146842 A1 | 6/2007 | Fan et al. | |

FOREIGN PATENT DOCUMENTS

| | | |
|---|---|---|
| EP | 0479497 | 4/1992 |
| EP | 0992163 | 4/2002 |
| GB | 2330471 | 4/1999 |

(Continued)

OTHER PUBLICATIONS

Slinger, et al., Computer-Generated Holography as a Generic Display Technology, IEEE Computer Society, Aug. 2005, pp. 46-53.

(Continued)

*Primary Examiner* — Jade R Chwasz
(74) *Attorney, Agent, or Firm* — Brooks, Cameron & Huebsch, PLLC

(57) ABSTRACT

A holographic volumetric display comprises a pattern generation unit (20), a programmable lighting device and a holographic screen (28). The holographic screen contains one or more pre-recorded set(s) of spatially sampled holographic interference patterns (or sub-holograms) each capable of reproducing one or more volume element(s) or voxel(s) (32) in three dimensional space outside the plane of the holographic screen when each sub-hologram is selectively illuminated. A sub-hologram is a sampled hologram of a voxel and sub-holograms in one set are spatially interleaved across the surface of the holographic screen with other sub-holograms. The programmable lighting device may be provided by a color digital projection unit (28) and the pattern generation unit which can illuminate any number of sub-holograms on the holographic screen. In this way, a volumetric display with holographic voxels can be made. The holographic volumetric display can reconstruct three-dimensional moving images in color.

17 Claims, 10 Drawing Sheets

(56) References Cited

FOREIGN PATENT DOCUMENTS

| | | |
|---|---|---|
| GB | 2350962 | 12/2000 |
| JP | 01-502459 | 8/1989 |
| JP | 03-073967 | 7/1991 |
| JP | 07-092890 | 7/1995 |
| JP | 10-170865 | 6/1998 |
| JP | 10-332917 | 12/1998 |
| JP | 11-194702 | 7/1999 |
| JP | 2003-021820 | 1/2003 |
| WO | 88/05174 | 7/1988 |
| WO | 99/00993 | 1/1999 |
| WO | 01/44858 | 6/2001 |
| WO | 2008/049912 | 5/2008 |

OTHER PUBLICATIONS

Favalora, Gregg E., Volumetric 3D Displays and Application Infrastructure, IEEE Computer Society, Aug. 2005, pp. 37-44.
Brown, Stuart F., Seeing Triple—Anticipated for decades, machines are finally displaying real objects in three true dimensions, Scientific American, Jun. 2007, pp. 86-89.
UK Intellectual Property Office, Patents Directorate, Patents Act 1997: Search Report under Section 17(5), Jul. 2, 2008, 3 pgs.
International Search Report and Written Opinion for PCT/GB2009/050224, Sep. 29, 2009, 21 pgs.
International Preliminary Report on Patentability for PCT/GB/2009/050224, May 25, 2010, 17 pgs.
Japanese Office Action for related Japanese Application No. 2010-549200, mailed Jul. 30, 2013, 4 pages.

* cited by examiner

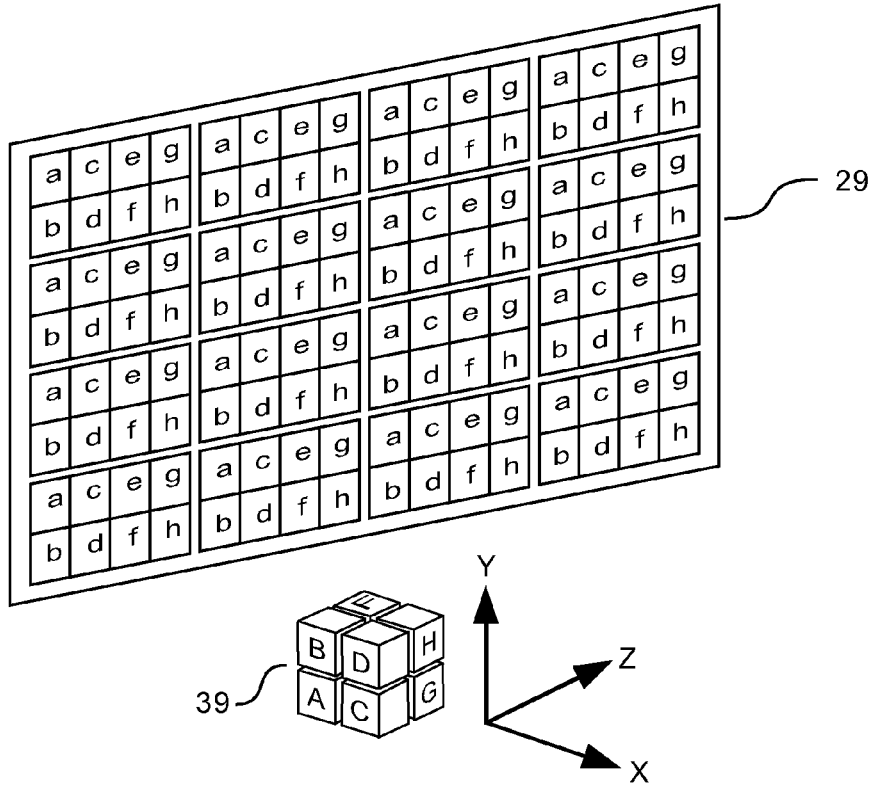
Figure 2
   
Figure 2a     Figure 2b     Figure 2c     Figure 2d
   
Figure 2e     Figure 2f     Figure 2g     Figure 2h

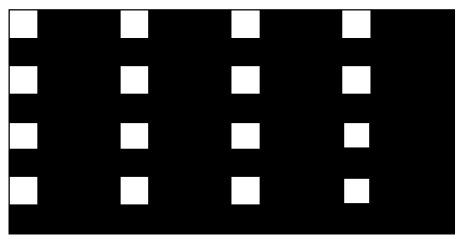
Figure 3a
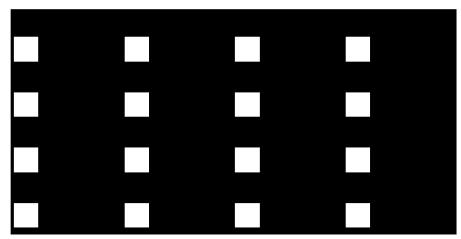
Figure 3b
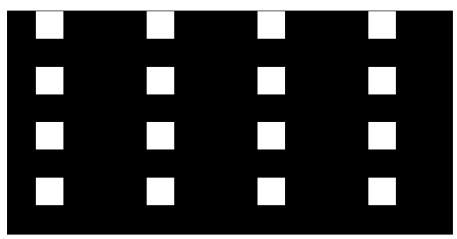
Figure 3c
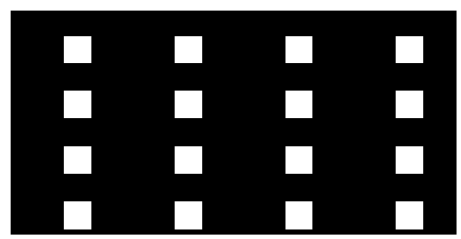
Figure 3d
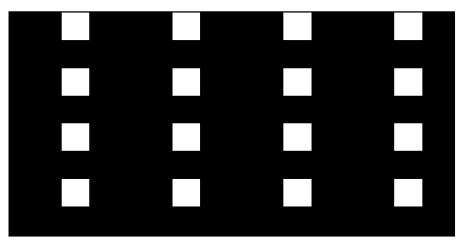
Figure 3e
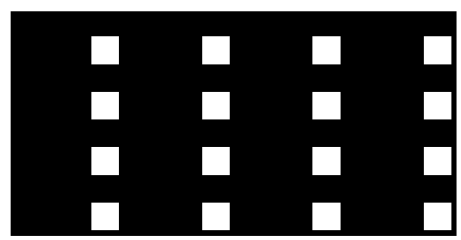
Figure 3f
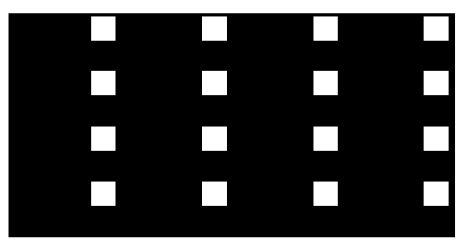
Figure 3g
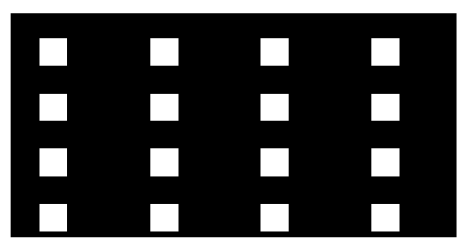
Figure 3h
Figure 3

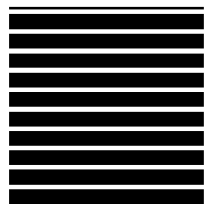 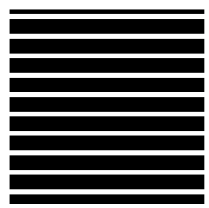 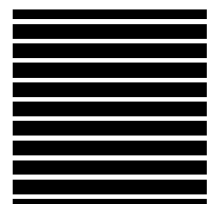 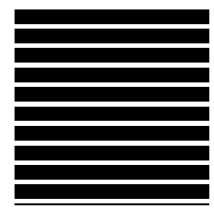
Figure 5a  Figure 5b  Figure 5c  Figure 5d
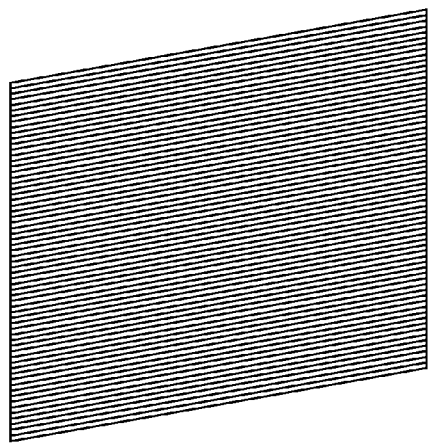 
Figure 5e
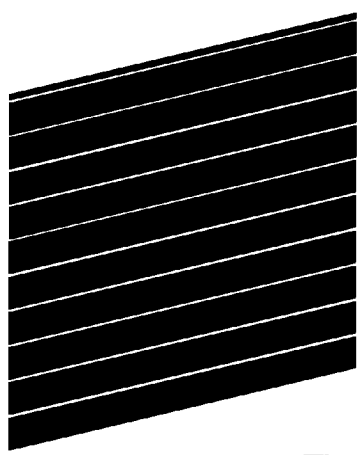 
Figure 5f

THREE DIMENSIONAL HOLOGRAPHIC VOLUMETRIC DISPLAY

This application is a National Stage application under 35 U.S.C. 371 of PCT/GB2009/050224 filed Mar. 5, 2009, and published as WO 2009/109785 A2 on Sep. 11, 2009, which claims priority to GB0804280.6 filed Mar. 7, 2008 and GB0804383.8 filed Mar. 10, 2008, the specifications of which are herein incorporated by reference.

The present invention relates to a method and apparatus for a holographic display and relates particularly but not exclusively to volumetric three-dimensional displays. The invention is a general-purpose 3D display that may be used in a wide range of applications requiring 3D visualisation.

BACKGROUND

Volumetric displays belong to a class of three-dimensional display technologies that produce volume-filling imagery. The volume is usually divided into identical volume elements or voxels placed on a grid. This is analogous to pixels in a two dimensional display. The 3D image is constructed by activating any number of voxels. The display is usually controlled by a computer that can make moving images in colour. Volumetric displays are autostereoscopic so viewers do not need any specialised equipment like eyewear or headsets to view a three dimensional image. Furthermore, the image should be visible by any number of viewers.

A common category of volumetric displays includes closed volume displays, which use the principles of swept-volume projection. These are based on mechanical methods such as a periodically moving screen, either rotating or back and forth, which is illuminated by a two dimensional projector that is synchronised with the motion of the screen. As the screen sweeps through the volume, many points in the volume can be illuminated, thereby presenting the human eye with the illusion of a volumetric display. Some of these displays depend on high-speed mechanical components such as a spinning semi-reflective screen whereas other non-mechanical approaches rely on switched stacked liquid crystal screens. Other closed volume technologies range from stacks of organic light emitting diodes or stacked electroluminescent screens to volumes of gas or plasma where the intersections of laser beams create voxels.

Open volume display technologies generate voxels in free space. An example of such a prior art display is based on a flat panel with a microlens array that creates voxels by focusing images at different locations in front of the screen. This technology relies on active matrix semiconductor fabrication techniques.

Prior art indicates that best three-dimensional images are produced by holograms. A hologram is a photosensitive film or plate, which stores diffraction patterns that cause incident light to interfere constructively and destructively to create a three dimensional image outside the plane of the hologram. The hologram stores frequency, amplitude and phase information such that it can reconstruct a three dimensional image when it is suitably illuminated by a light source. The main drawback with holograms is that they can only produce static 3D images. Limited animation is possible with sequences of fixed static 3D images multiplexed on the hologram where the illusion of motion is given by the relative movement of an observer to the hologram. Current holographic printing technologies are capable of producing full colour full parallax 3D images, which are viewable under normal indoor lighting conditions.

A three-dimensional volumetric display is presented in PCT/US00/34466 by Zhan He of Revo Inc, USA. This display is based on a flat panel with a microlens array that creates voxels by focusing images at different locations in front of the screen. The microlens array may be fabricated on a flat panel using active matrix semiconductor fabrication techniques. The present invention does not rely on such focusing or fabrication techniques.

Conventional approaches to holographic displays have focused on high-resolution 3D imaging based on spatial light modulation (SLM) technology. SLMs are digitally programmable diffractive holographic elements that can modulate the phase and/or amplitude of the coherent light passing through it. The diffraction pattern corresponding to the 3D image is first computed and then transferred to the SLM. These are also known as Computer-Generated Holographic (CGH) displays. Examples of SLM-based approaches to holographic displays are described in EP 0992163 Autostereoscopic Display by A. Travis of Cambridge University, UK and IEEE Computer Magazine 2005, article 'Computer Generated Holography as a Generic Display Technology', by Chris Slinger et al, Qinetiq Malvern, UK. SLMs are active components that need to be either optically or electronically addressed. Ideally, the SLM needs to behave like a programmable holographic film. Hence the pixel feature size of the SLM needs to be similar to that of the grains within the holographic film emulsion, thereby requiring nanoscale semiconductor technologies that are several generations away from current micron scale feature sizes found in microdisplays. In addition, the SLM-based approach has substantial drawbacks in terms of the substantial computational power and bandwidth needed to calculate the diffraction patterns and to distribute them. SLM components need to be large area devices but this is not feasible or economic using current semiconductor fabrication techniques. This therefore necessitates the use of arrays of smaller SLMs in order to cover a larger area, thus further compounding the bandwidth issue as well as introducing further mechanical and optical problems in mounting the array. Hence, CGH displays based on SLMs or SLM arrays are not commercially viable for cost, performance and technology reasons. Holographic displays based on SLMs are high resolution. The present invention is fundamentally different from SLM approaches in that it is a low-resolution display and it does not depend on SLMs or any active component. Instead, it uses a passive holographic screen, e.g. a film, plate, silica substrate or photopolymer, to record a set of pre-defined 3D images or volume elements, which can be selected individually.

A segmented 3-D hologram display is presented in PCT/US87/03022 by G. Moss of Hughes Aircraft Company, USA. The display consists of several individual holograms embedded in an automobile windshield with each hologram capable of producing segments of a seven segment display. It enables the driver to view digits which are reconstructed outside the plane of the windshield. The holograms are either edge-lit or selectively illuminated. The present invention is a general purpose volumetric holographic display that has applications in many commercial and industrial fields. The invention is based on generic volume elements or voxels, rather than 2D style display segments. The invention uses a holographic screen where the sub-holograms are spread across the surface of the holographic screen, rather than a collection of single holograms.

SUMMARY OF THE INVENTION

The invention relates to a method and apparatus for a holographic 3D volumetric display system consisting of a programmable lighting means that illuminates a holographic screen comprising smaller sub-holograms which, in turn, may comprise smaller holographic tiles. The programmable lighting means may be provided by an image pattern generation unit that drives a display unit.

Accordingly, the present invention provides an apparatus for a holographic volumetric display comprising a programmable lighting means and a holographic screen, wherein said screen comprises a set of sampled and interleaved holograms, or sub-holograms, capable of reconstructing a set of pre-recorded holographic volumetric elements in three dimensional space outside the plane of the holographic screen when the respective sampled and interleaved holograms are selectively illuminated by the programmable lighting means.

The apparatus may comprise a multitude of holographic volumetric displays where multiple passive holographic screens can be arranged to make larger composite holographic volumetric displays with multiple or shared programmable lighting means. The holographic screen can be composed of a plurality of spatially interleaved or multiplexed sub-holograms across the surface of the holographic screen and where each sub-hologram reconstructs a unique voxel in three dimensional space outside the plane of the holographic screen. It is possible for each sub-hologram to be composed of a plurality of smaller holographic tiles, and for each sub-hologram or holographic tile to be composed of any type of hologram material, with the holographic tiles from which such sub-hologram images are reconstructed being non-contiguous and spread out across the surface of the holographic screen.

Optionally, the screen comprises a colour holographic screen comprising interleaved or stacked red, green and blue holographic screens within the same sub-hologram positions such that their holographic voxels overlap spatially.

The programmable lighting means may comprise an image pattern generation unit and a display unit.

The image pattern generation unit can be configured to receive three dimensional images with a means to convert them into two dimensional image pattern sequences for output to a display device. In use, respective sub-holograms will be selectively illuminated to recreate the corresponding pre-recorded holographic volumetric elements in three dimensional space outside the plane of the holographic screen. It may also comprise one or more of logic gates, a computational device, gate array device, memories and video output hardware. Suitably, the image pattern generation unit may be configured to receive control and configuration parameters including firmware, program code, sub-hologram descriptions, image patterns, holographic tile descriptions, holographic screen size, number of holographic screens, orientations of multiple holographic screens or image sequencing.

The apparatus may include a driver for an adapted image pattern generation unit that drives multiple display units to make larger holographic volumetric displays.

The apparatus preferably includes a display controller for controlling the display such that successive 3D images are displayed at a sufficient frame rate according to the human persistence of vision to give the impression of moving 3D holographic images.

The display unit may typically comprise a digital projection unit, which may be a digital colour projector or a laser projector. Alternatively, or additionally, the display unit may comprise an LCD panel together with a polarised light source and/or an emissive display such as a plasma display, LED display, OLED display or a colour laser diode array optically coupled to the holographic screen. In such an embodiment, the modified display unit may integrate the image pattern generation unit within the display unit.

Within the confines of the invention, the holographic screen may be configured to reconstruct any number of holographic voxels, where the holographic voxels may be of different arbitrary sizes and geometries, and the holographic voxels may be located in any arbitrary positions in three dimensional space outside the plane of the holographic screen within the boundaries of the manufacture of the holographic screen.

It is also possible to configure the holographic screen of the invention so as to make image segments, dot-matrix segments, alphanumeric segments, gauge segments, bar-graph segments, symbol segments or icon segments. The holographic voxels can be configured as regular three dimensional shapes such as cubes, spheres or points, to be spaced regularly in three dimensional space or, alternatively, to overlap or occupy the same three dimensional space.

According to another aspect of the present invention there is provided a method for constructing a holographic screen with spatially distinct holographic voxels where the sub-holograms and holographic voxels are recorded on to a holographic film or plate by means of transfer image holography comprising the steps of: (a) making a master transmission hologram H1 of a voxel, (b) placing the master holographic voxel in different positions, (c) placing different sub-hologram masks for each holographic voxel position in front and behind the holographic film or plate, (d) recording the H1 voxel on to the masked H2 hologram A method may be used to construct a holographic screen with spatially overlapping holographic voxels where the sub-holograms and holographic voxels are recorded on to a holographic film or plate by means of transfer image holography comprising the steps of: (a) making a set of master transmission hologram H1 of a series of voxels, (b) placing the master holographic voxels in the same position, (c) placing a different sub-hologram mask for each holographic voxel in front and behind the holographic film or plate, (d) recording the H1 voxel on to the masked H2 hologram. The holographic screen can be constructed by means of a holographic printer using a series of computer-generated voxels from a variety of perspectives to make a holographic stereogram. The holographic screen may alternatively be computed numerically where the interference patterns corresponding to the sub-holograms and their voxels are transferred to a suitable substrate such as silica or polymer by means of photolithography, embossing or photo-reduction techniques.

The volumetric holographic display may be constructed so that any number of holographic voxels may be reconstructed in three dimensional space outside the plane of the holographic screen by the step of illuminating the corresponding sub-holograms via the programmable lighting means.

Where the display includes colour holographic voxels, these may be reconstructed by illuminating the corresponding sub-hologram with red, green and blue light sources of varying intensities. Typically the colour of the light sources will match the colour frequencies of the red, green and blue lasers used to create the sub-holograms or holographic tiles on the holographic screen, so that colour images can be reconstructed.

The method of making the display of the invention may include an image pattern generation unit which makes a two dimensional patterns comprising the steps of: (a) receiving a description of the 3D image, (b) transforming each voxel co-ordinate into a 2D image pattern corresponding to the pattern of its sub-hologram and applying the voxel colour to each 2D image pattern, (d) superimposing all 2D image patterns into a final image pattern, (d) output the final image pattern on the display unit.

In summary, invention combines holographic and volumetric techniques to make a holographic volumetric screen capable of displaying three-dimensional images. The invention uses a novel way of recording traditional holograms and replaying them. It takes a series of holograms and samples them to make sub-holograms. All of these sub-holograms may then be interleaved spatially to make a single composite hologram. Such a composite hologram corresponds to the holographic screen. Each sub-hologram contains a simple holographic image corresponding to a voxel in 3D space. On replay, any of the pre-recorded sub-holograms on the holographic screen can be addressed via selective illumination using a programmable lighting means. In some embodiments, the sub-hologram may be regarded as being composed of a matrix of smaller holographic tiles that are spread across the surface of the holographic screen.

This can be contrasted with a traditional hologram, which uses the entire surface area to store diffraction patterns on a holographic film or plate to reconstruct wavefronts corresponding to a whole 3D image or series of 3D images when illuminated by a bright light source.

Conventional approaches to volumetric displays have a number of drawbacks. Closed volume technologies have voxels trapped within the display so the user cannot interact with them. Some of these rely on unsafe and unreliable high-speed mechanical components such as spinning screens or stacked arrays of passive screens have limited depth resolution, as described in the Scientific American article, 'Seeing triple', June 2007. Most of these technologies are not scalable in terms of size due to inertial or other mechanical constraints so there are limits to how large they can be made. Open volume displays are complicated to manufacture and tend to be very costly. Volumetric displays currently tend to be limited to high-end professional applications such as medical imaging or computer-aided design for engineering.

The holographic volumetric display of the present invention overcomes many limitations of conventional approaches to volumetric displays. No special eyewear is required and the image can be seen comfortably by a large number of viewers. The holographic volumetric display is simpler and cheaper to manufacture than current volumetric display technologies. The display is more reliable and quieter than mechanically driven volumetric displays as it does not require any, or very few, moving parts.

The invention improves on current holographic techniques by overcoming the limitations of multiplexed holograms with static 3D image to realise a dynamic holographic volumetric display. The holographic screen is passive so it does not need to be powered like active matrix systems based on SLMs. The 3D image can appear to be floating in mid-air where viewers can interact directly with it. The holographic volumetric display is capable of showing moving 3D images in full colour. The invention is general-purpose and applicable in a large range of commercial or industrial applications requiring 3D visualisation.

DESCRIPTION

Aspects of the present invention will now be more particularly described by way of example only with reference to the following drawings, in which:

FIG. 2 shows the configuration of the holographic tiles on the holographic screen and how they map on to voxels in 3D space. FIGS. 2a to 2h show the patterns for each holographic tile.

FIGS. 3a to 3h show the patterns for each sub-hologram with all of its holographic tiles on the holographic screen.

FIGS. 5a to 5f show an alternative sub-hologram topology for overlaid symbolic voxels.

Figure 1:
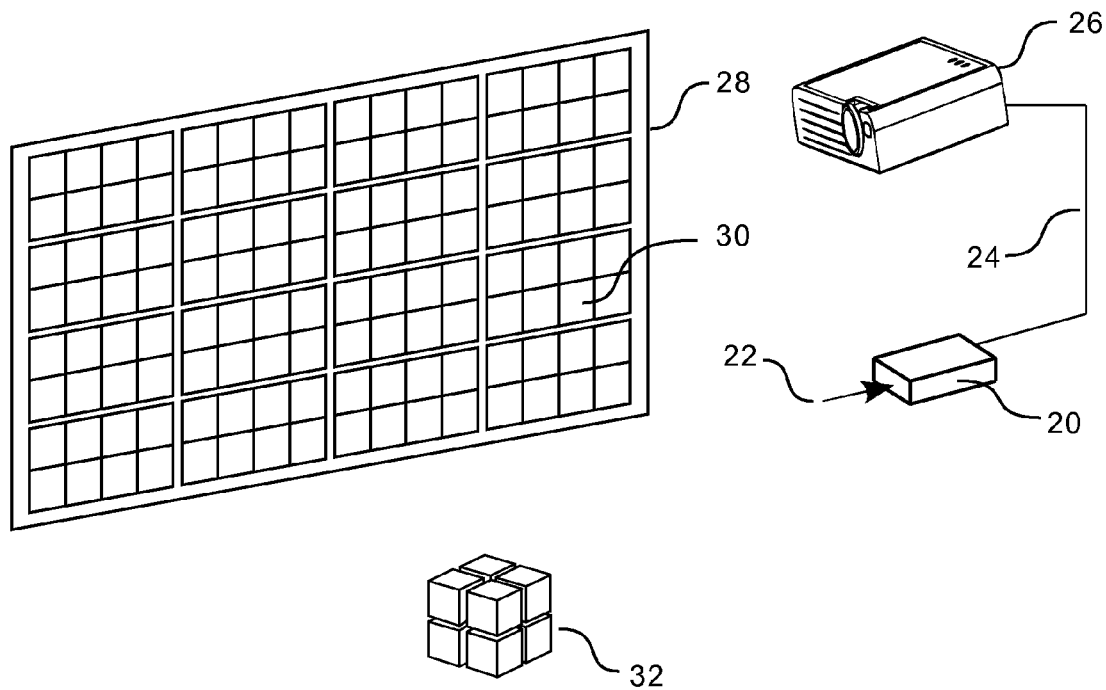
FIG. 1 shows the main components of a projection-based holographic volumetric display system and FIG. 1a shows a side-on view of the display system.
Figure 1A:
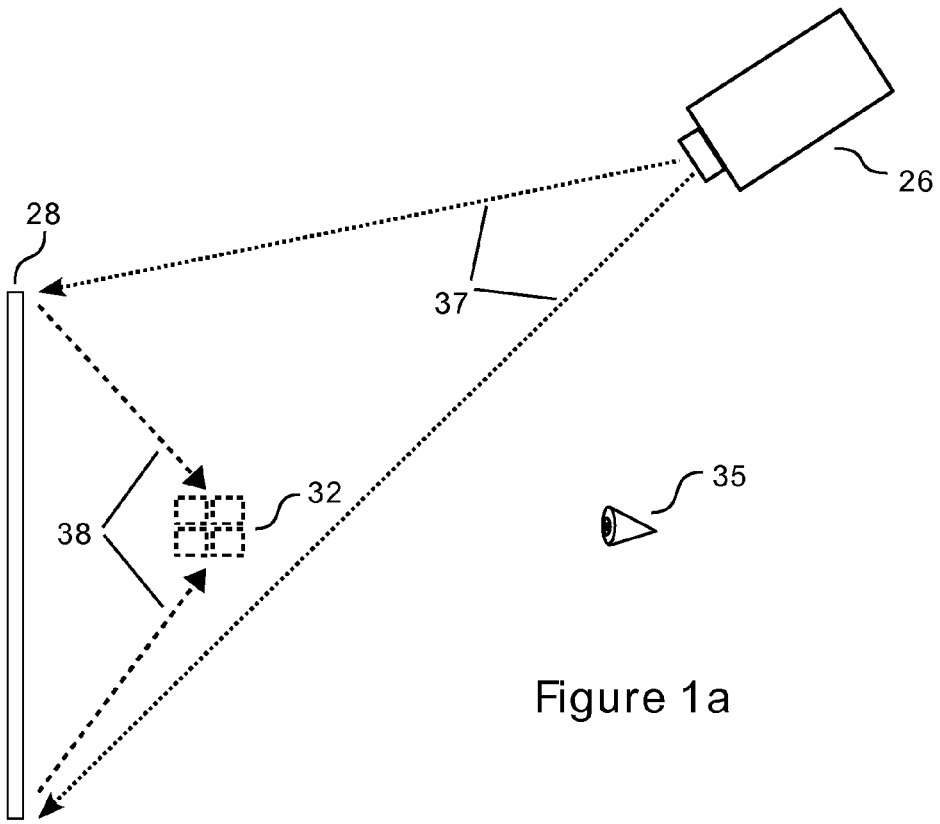

FIGS. 1 and 1a illustrate a minimal 2×2×2 holographic volumetric display. The preferred embodiment is FIG. 1, where the holographic screen 28 is illuminated by a programmable lighting means comprising an image pattern generation unit 20 connected to a colour digital projector 26 via a video interface 24. The image pattern generation unit 20 receives a rendered 3D image as a set of voxel descriptions 22. The holographic screen contains sub-holograms made out of a matrix of holographic tiles 30 that reconstruct the voxels 32 when the sub-holograms are illuminated by the programmable lighting means. FIG. 1a shows a side-on view of the projector 26, holographic screen 28, voxels 32, viewer 35 and light beams 37 and 38. The projector 26 illuminates the holographic screen 28 via the light beams 37. The light beams 38 reflect off the sub-holograms on the holographic screen 28 and reconstruct the voxels 32 in front of the viewer 35.

Any sub-hologram can reconstruct any 3D shape at any location outside the plane of the holographic screen within the constraints of the manufacturing parameters of the holographic screen. The sub-holograms may be of different sizes and geometries. Sub-holograms may be spread out across the surface of the holographic screen and they may be composed of even smaller holograms or holographic tiles. In the example presented in FIG. 1, each sub-hologram has the sampled interference pattern of a three dimensional cube pre-recorded on it that corresponds to a unique holographic voxel positioned in front of the holographic screen when it is illuminated via the projector.

The mapping of sub-holograms and holographic tiles to voxels are depicted in FIG. 2. The holographic screen 29 contains a 4×4 grid of holographic tiles, with each tile comprising eight holographic sub-tiles, labelled a to h, and the corresponding voxels 39 are labelled A to H. The (x,y,z) co-ordinates of the eight voxels are given as follows: A(0,0,0) B(0,1,0) C(1,0,0) D(1,1,0) E(0,0,1), F(0,1,1) G(1,0,1) H(1,1,1). Note that voxel E cannot be seen in FIG. 2 as it is located below voxel F. The illumination patterns for each holographic tile are shown in FIGS. 2a to 2h. The black areas imply no light whilst the white areas imply illumination.

FIG. 3 shows an example of how sub-holograms can be made from the holographic tiles. The FIGS. 3a to 3h depict the sub-holograms as arrangements of the holographic sub-tiles 2a to 2h. Each sub-hologram can reconstruct the voxels labelled A to H in FIG. 2. The holographic tiles and sub-holograms are spatially multiplexed across the surface of the holographic screen.

The 3D image is represented as a collection of voxels by (x,y,z) co-ordinates and a set of primary colours with red, green and blue [r,g,b] parameters. The primary colours can be represented by normalised values between 0 and 1.0 where 0 means no colour and 1.0 means a pure colour. Hence [1,0,0] is red, [1,1,1] is white, [0,0,0] is black, [0.5, 0.5, 0.5] is grey, [0,1,1] is cyan and so on. Red, green and blue voxels occupy the same space so they can be recombined with varying degrees of luminosity to present any visible colour to the human eye.

Figure 4A:
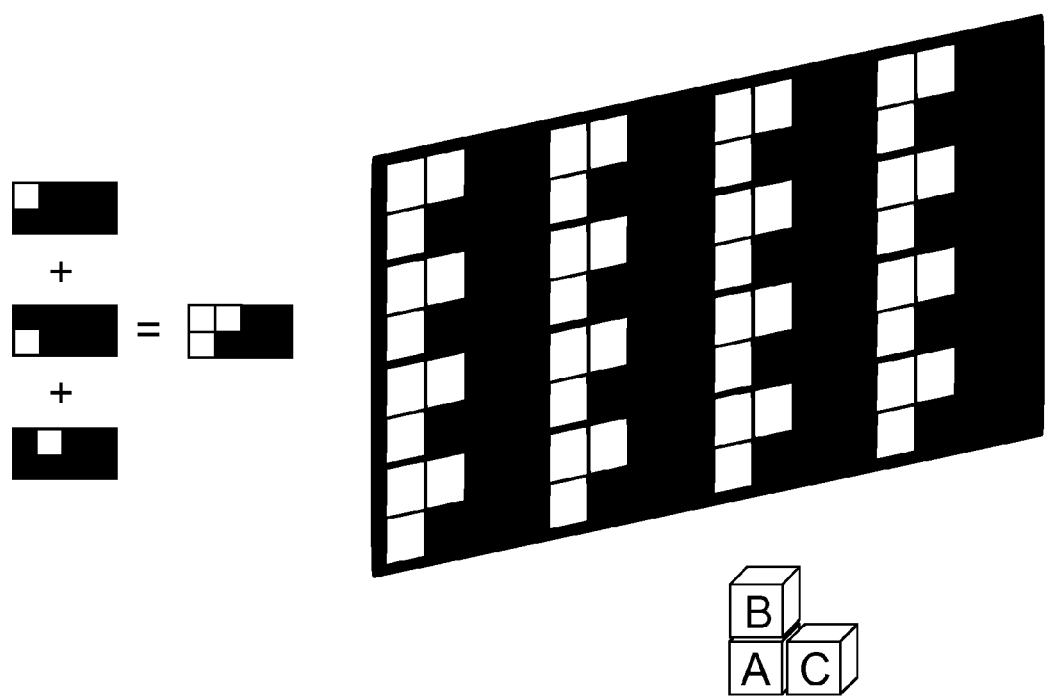
FIG. 4a shows the illumination pattern for an 'L' shaped 3D image.

The role of the image pattern generation unit 20 is to map a rendered 3D volumetric image, comprising any set of voxels A to H, on to the holographic screen 28. It receives a set of voxels and colours via the digital interface 22. The image pattern generation unit then creates a superposition the patterns given in FIGS. 2a to 2h and applies the colours, which it then displays on the colour digital projector 26. For example, a white "L" shaped image could comprise the voxels A, B and C in FIG. 2. The co-ordinates and colours for this shape are given by: (0,0,0)[1,1,1]; (0,1,0)[1,1,1]; (1,0,0)[1,1,1]. The corresponding illumination pattern is a superposition of the patterns given in FIGS. 3a, 3b and 3c, based on the holographic sub-tiles in FIGS. 2a, 2b and 2c. This pattern is projected on to the holographic screen as shown in FIG. 4a. The corresponding 3D image is reconstructed as the 'L' shaped voxels.

Figure 4B:
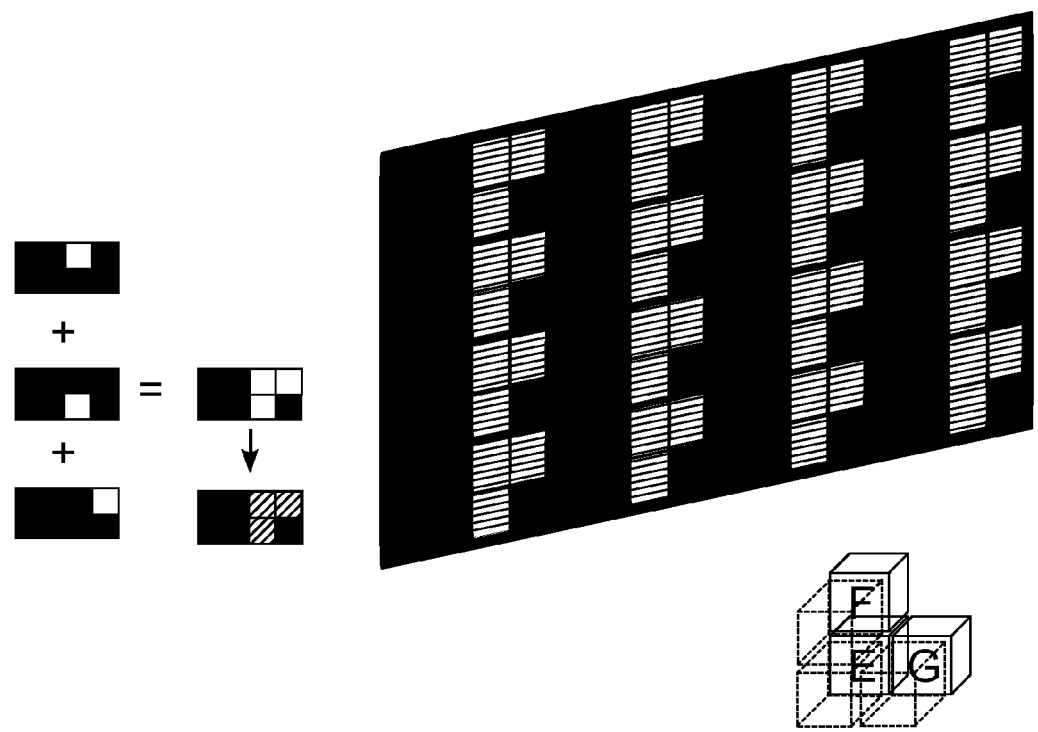
FIG. 4b shows how an 'L' shaped image can be moved in 3D space and its colour changed.

To take this example further, a different yellow "L" shaped 3D image could comprise the voxels E, F and G in FIG. 2 (note that voxel E is not visible in the figure), corresponding to the (x,y,z)[r,g,b] values: (0,0,1)[1,1,0]; (0,1,1)[1,1,0]; (1,0,0)[1,1,0]. The illumination pattern is given by the superposition of FIGS. 3e, 3f and 3g, based on the holographic sub-tiles in FIGS. 2e, 2f and 2g, and applying the colour yellow to the white areas of the superposed image. This is shown in FIG. 4b, where the yellow 'L' shaped voxel is reconstructed one voxel behind (on the z-axis) the previous white image. The position of the previous white 'L' image is shown in outline form in FIG. 4b. There is a direct correspondence with the colour of the sub-hologram and the voxel it reconstructs.

If the illumination pattern of the previous example, FIG. 4a, is suddenly replaced by the pattern in FIG. 4b then the "L" image will appear to jump by one voxel along the z-axis and change colour from white to yellow, as illustrated in FIG. 4b. If the pattern alternates between FIGS. 4a and 4b then the image will appear to move back and forth by one voxel along the z-axis and switch colour between white and yellow. If the illumination pattern cycles through the patterns in FIGS. 3a to 3h then the viewer will see a single voxel moving through the all voxel positions A to H in FIG. 2. In this manner, moving 3D colour images can be constructed provided the frame rate between successive 3D images is sufficient to fulfil the criteria necessary for the human persistence of vision.

Hence, by changing the illumination pattern together with the colours within the pattern corresponding to sub-holograms, full colour moving 3D images can be produced at any frame rate supported by the projector. The minimal 2×2×2 holographic volumetric display described in FIGS. 1 to 4 is for illustrative purposes only. It will be readily apparent to those skilled in the art that the resolution and dimensions of the holographic volumetric display may be scaled to much higher dimensions for practical displays. Consequently, the geometries and layout of the holographic tiles and sub-holograms would be more complex than shown here. Indeed, the sub-holograms or tiles may be of different shapes, sizes and orientations.

The voxels may be used to create 2D as well as 3D holographic displays, or a combination of both. The voxels can be any size or shape and it is even possible for two or more voxels to occupy the same volume where an individual voxel can be selected by different illumination patterns on the holographic screen. If such a holographic screen is illuminated uniformly then all voxels will be visible. An example of such overlaid voxels could be currency symbols: $, €, £ and ¥. In this example, there are four voxels which means four distinct sub-holograms are needed to reconstruct them. The sub-holograms are shown in FIGS. 5a to 5d corresponding to the symbols $, €, £ and ¥. The holographic tiles are horizontal slits across the length of the holographic screen. Each symbolic voxel is reconstructed by a number of horizontal slits. If the whole holographic screen is illuminated then all voxels will appear but they will be superimposed upon each other, since they occupy the same space, as shown in FIG. 5e. Such an assembly of voxels is not intelligible. However, if the holographic screen is illuminated with one of the sub-holograms in FIGS. 5a to 5d then only the corresponding currency symbol will be shown. This is shown in FIG. 5f for the € symbol corresponding to the sub-hologram of FIG. 5b.

Figure 6A:
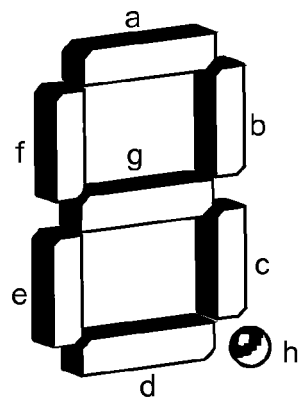
FIGS. 6a to 6c show an alternative segmented voxel configuration to make other styles of displays.
Figure 6B:
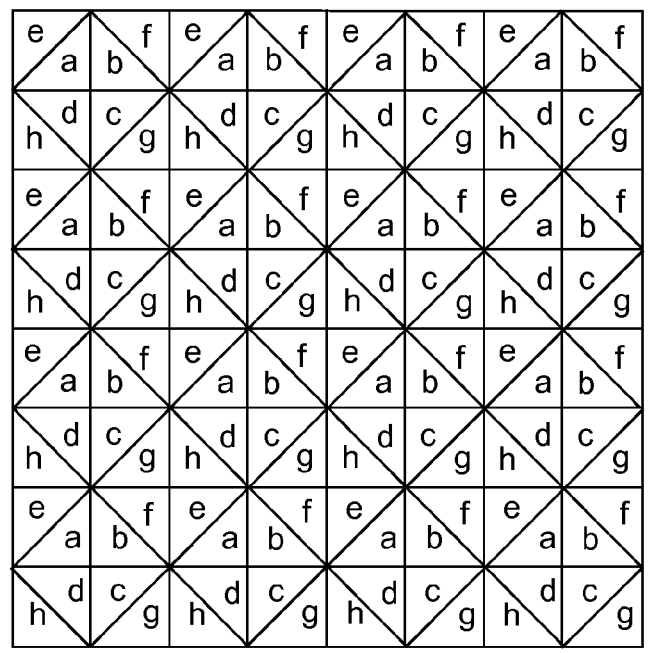
Figure 6C:
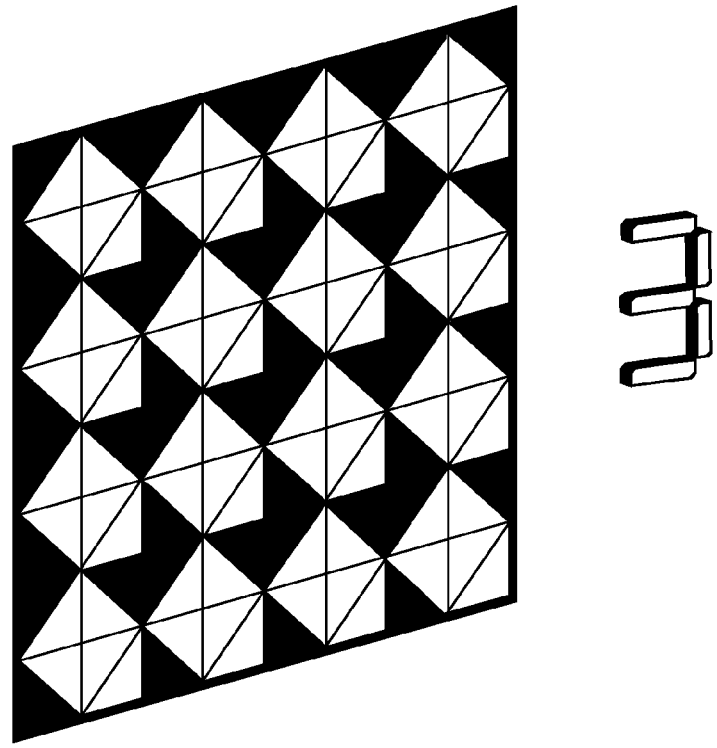

Alternative voxel configurations can be used to construct other types of 2D style displays such as segmented displays. FIG. 6a shows an example of a voxel-based display of the popular seven segment display for the digits 0 to 9 plus a dot. In this example, each voxel represents a single segment labelled a to h in FIG. 6a. These voxel segments may be recorded on to the sub-holograms and holographic tiles shown in FIG. 6b. If such a holographic screen is illuminated then all voxel segments will appear like the digit 8 plus a dot. The digit 3 consists of the voxel segments a, b, c, d, g which correspond to similarly labelled the sub-tiles in FIG. 6b. FIG. 6c shows how the illumination pattern displays the digit 3 as a reconstruction of segmented voxels.

Voxels may be used to construct other types of 2D style displays such as segmented displays, dot-matrix displays, gauges, bar graphs, fixed text messages, letters, numerals, signs, icons or symbols e.g. currency or mathematical symbols.

Image Pattern Generation Unit

Holograms need to be carefully illuminated by a bright light source with the correct spectral properties in order to clearly show the stored 3D image. The light source has to be positioned within a narrow range of angles to the plane of the hologram. If these conditions are not met then the stored 3D image will not be correctly reconstructed, if at all. The invention exploits these properties of holograms to selectively illuminate groups of sub-holograms by means of two dimensional patterns projected on to the holographic screen. If there is an absence of light i.e. where the projected 2D image is black then the sub-hologram will not be illuminated and it cannot therefore reconstruct the corresponding voxel. In this manner, voxels can be rendered either visible or hidden i.e. switched on or off through selective illumination.

The image pattern generation unit takes rendered 3D images as sets of voxel descriptions in terms of co-ordinates and colours to produce illumination patterns corresponding to the shapes of the sub-holograms in FIGS. 3a to 3h. The image pattern generation unit may be implemented by those skilled in the art of computer graphics software and digital image processing hardware. The image pattern generation unit converts voxel descriptions to images via the following steps:

1. Receive a description of a rendered 3D image in terms of co-ordinates and colours
2. Transforming each voxel co-ordinate into a 2D image pattern corresponding to the pattern of its sub-hologram and apply the voxel colour to each 2D image pattern
3. Superimposing all 2D image patterns into a final image pattern
4. Output the final image pattern on the display unit
5. Repeat step1 for the next 3D image The image pattern generation unit may be implemented as a computer connected to a display unit. The 3D images and voxel descriptions may be generated by an external algorithm or they may be received via any input interface such as a keyboard, network or local disc. A computer-implemented version of the image pattern generator may receive the 3D image as an array of voxels in step 1 above. The algorithm may use tiles to make the sub-hologram patterns corresponding to voxels in step 2 by means of a lookup table that maps each voxel to a tile description. The tile description contains geometric information about how to generate a tile e.g. in terms of polygon vertices of the holographic sub-tiles as in FIGS. 2a to 2h. The remaining steps 3, 4 and 5 are relatively straightforward to implement. Step 5 needs to be executed in a timeframe consistent with the human persistence of vision to give the illusion of motion. The algorithm may be realised by means of a graphics language such as OpenGL or other graphics library APIs included with popular computer languages such as C, C++, Java or Python.

Figure 7A:
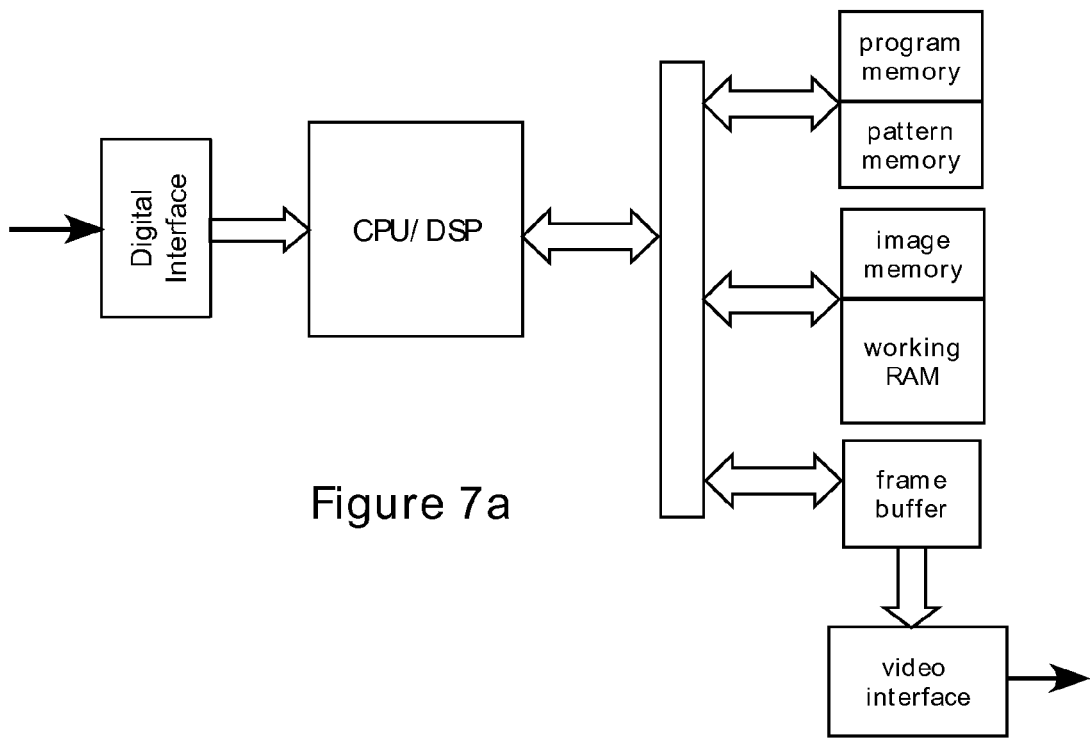
FIGS. 7a and 7b shows the main components of hardware-based implementations of the image pattern generation unit.

A hardware implementation of the image pattern generation unit may be based on a computational device such as a DSP, CPU or micro-controller. An example of such an implementation is given in FIG. 7a where all the processing is done by the computational device in conjunction with interfacing logic devices and memories. The program and pattern memories may be read-only memories which respectively hold the software algorithms and the sub-hologram patterns as bitmaps. There are no holographic tiles in this implementation, instead all sub-holograms are stored as bitmaps in a pattern memory i.e. digitised versions of the images in FIGS. 3a to 3f. The read-write random access memory (RAM) holds the working memory for variables as well as an image memory. The framebuffer is an area of memory accessible to the video output hardware. The 3D image is received as an array of digitised rendered voxel co-ordinates and colours via the digital interface. The voxels are decoded and held in the working RAM as an array. Once all voxels are received, the framebuffer is cleared to black. The second step is to lookup the sub-hologram pattern in the pattern memory corresponding to the voxel and load it into the image memory. The third step is to apply the voxel colour to the white areas of the sub-hologram pattern in the image memory. Fourth, the image memory is added to the existing contents of the framebuffer. These three steps are repeated for all voxels. Finally, the framebuffer is output to the display device.

Figure 7B:
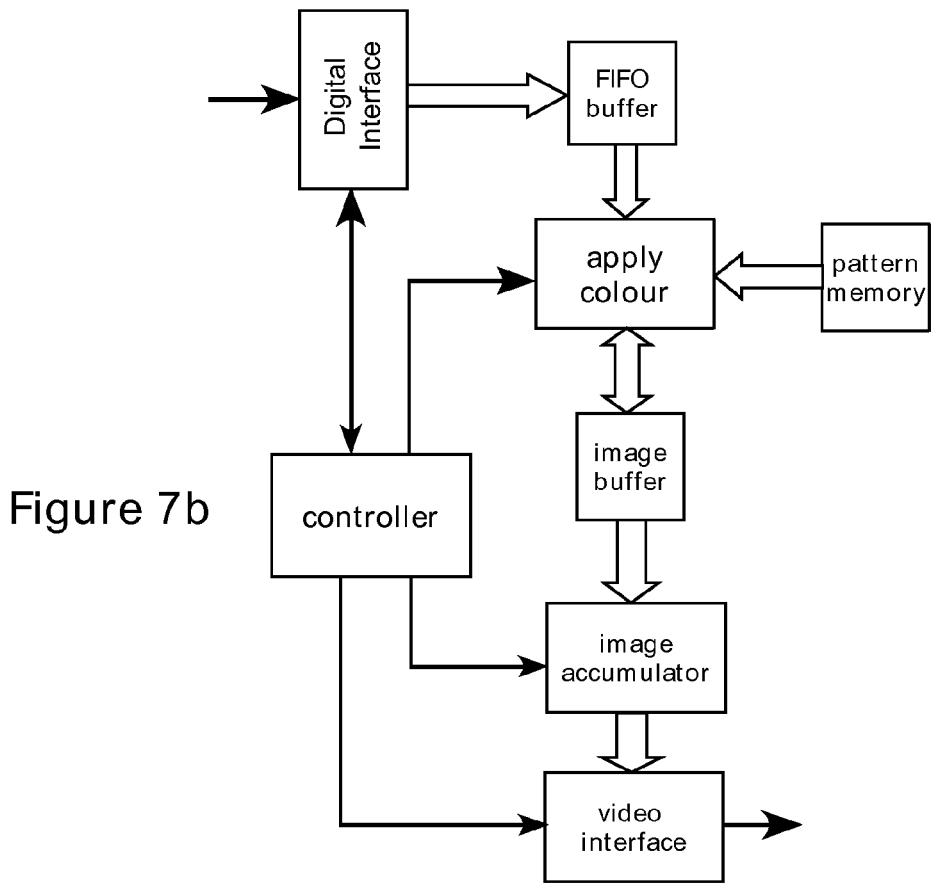

A hardware implementation of the image pattern generation unit is illustrated in FIG. 7b. The architecture of this implementation is based on memories and logic processing blocks. The implementation may be realised in discrete logic or field programmable gate array devices. There are no holographic tiles in this implementation, instead all sub-holograms are stored as bitmaps in a pattern memory i.e. the images in FIGS. 3a to 3f. It is assumed that all other memories are cleared as a precondition. The 3D image is received as an array of digitised rendered voxel coordinates and colours via the digital interface. The voxels are decoded and held in a FIFO memory buffer for each 3D image. The 'apply colour' block loads a pattern corresponding to a voxel into the image buffer and then applies the colour to the pattern in the image buffer. The image accumulator block takes the contents of the image buffer and adds it to the current image in the accumulator. The pattern accumulation sequence is done for all voxels which results in a combination of all the sub-hologram patterns. This final pattern is sent to the display device via the video interface. The controller block manages the control and sequencing of the data flow from start to finish, beginning with the input voxels and ending with the video interface. The controller repeats the entire sequence for moving images.

The hardware implementations require a means to receive instructions from an external host computer for control and configuration of the image pattern generation unit. This may be done via the digital interface 22 which can be implemented as a computer network interface, a serial bus interface or a wireless interface. Instructions may include uploading new program code or logic firmware, reset, configuration parameters, sub-hologram patterns, holographic screen size, number of holographic screens, image sequencing etc. The configuration operations may include operations such as initialising the pattern memories for various types of holographic screens.

Manufacturing the Holographic Screen

Figure 8:
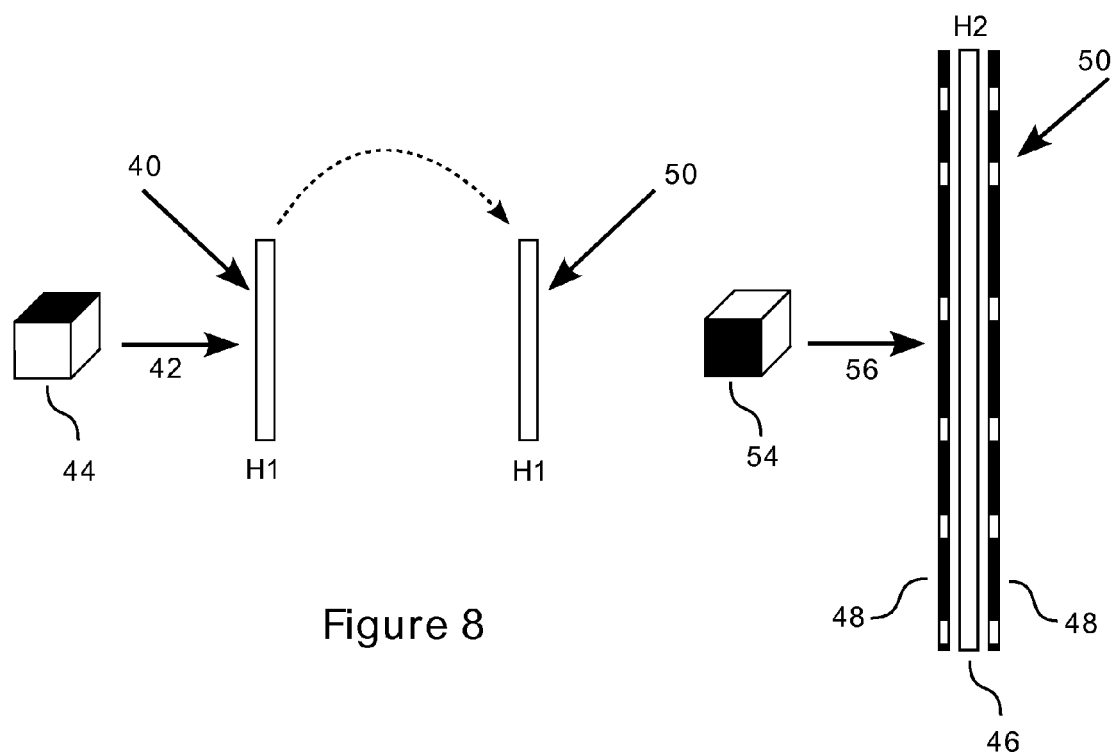
FIGS. 8 and 8a show how a holographic screen can be manufactured.

The holographic screen can be readily manufactured via a variety of prior art methods by those skilled in the art of optical holography. A basic method for making a monochromatic holographic screen is described herein. The sub-holograms on the holographic screen are based on the principle of transfer holograms or image holography. This is a two-stage process where a hologram of a hologram is made. A master transmission hologram, known as H1, is recorded which acts as the object for a second reflection hologram, known as H2. In this implementation, holographic film is preferable to holographic plates. The principle is illustrated in FIG. 8. H1 is first recorded as a master transmission hologram with a laser reference beam 40 incident at an angle of 45 degrees on the surface of H1 and object beam 42 represents a voxel 44 in the shape of a cube. Once H1 is recorded, processed and developed, it is flipped by 180 degrees for recording the stored image on to the H2 hologram 46. H2 is sandwiched between a pair of identical masks 48 and is recorded with laser reference beams 50 and object beam 56 from the reconstructed holographic voxel 54. In this implementation, H2 is much larger than H1 to compensate for the reduction in recording surface area due to the masks 48.

Figure 8A:
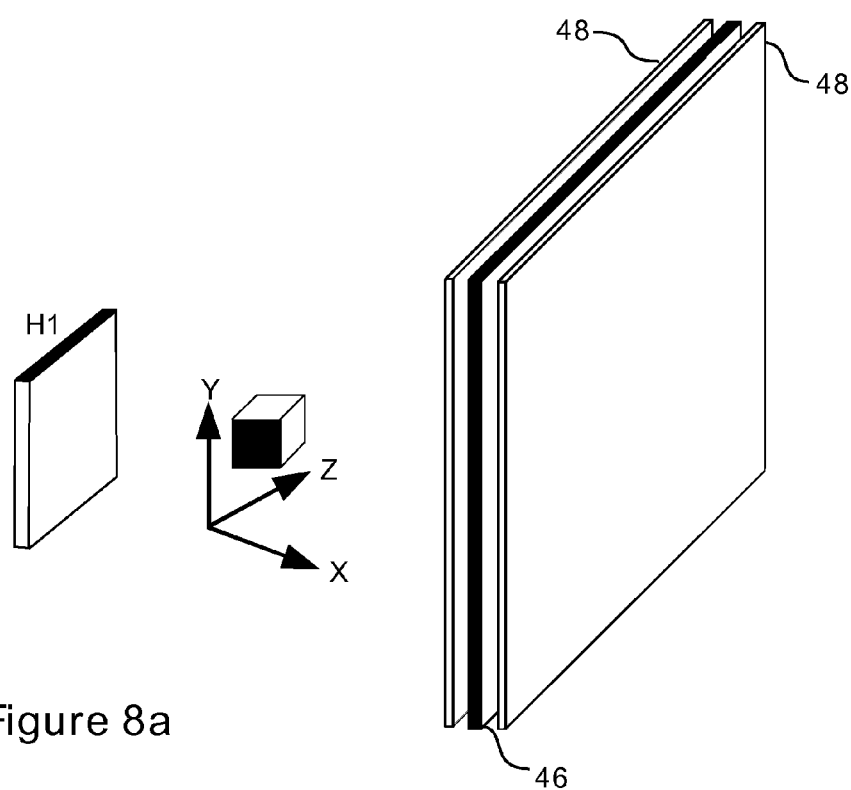

The holographic voxel on H1 is recorded eight times in eight different positions in 3D (x,y,z) space on to H2 with eight different masks. The position of H2 is fixed. The masks correspond to the patterns in FIGS. 3a to 3h. The voxel recording configuration is illustrated in FIG. 8a and the process is described as follows:

1. Place the H1 hologram in (x,y,z) space such that its reconstructed voxel is in position A, according to FIG. 2
2. Place two identical masks 48, according to FIG. 3a, before and behind the H2 hologram 46
3. Expose H2 by switching on the laser to provide the reference beams 50 and object beam 56

These steps are repeated another seven times by changing the place of the H1 voxel to position B (FIG. 2) in step 1 and the mask to FIG. 3b in step 2, and so on until position H (FIG. 2) and mask FIG. 3h is reached. The H2 film or plate can then be processed and developed. H2 now contains a representation of the holographic screen.

The process for making a holographic screen with overlaid symbolic voxels as shown in FIG. 5e is similar. However, this requires a set of four H1 master holograms for each of the symbols: $, €, £ and ¥. The steps are described as follows:

1. Place the H1 hologram for the $ symbol in front of the H2 hologram 46
2. Place two identical masks 48 according to FIG. 5*a*, before and behind the H2 hologram 46
3. Expose H2 by switching on the laser to provide the reference beams 50 and object beam 56

These steps are repeated another three times by replacing H1 with the next symbol in step 1 and the mask to FIG. 5*b* in step 2, and so on until all symbols are recorded. H2 then contains a representation of the holographic screen in FIG. 5*e*.

A hologram generally contains diffraction patterns of the 3D image across its entire surface area. If one part of such a hologram is removed then it still contains the 3D image but only from its own unique perspective. This is equivalent to placing a mask with a single hole in front of a hologram so the 3D image is viewable from the perspective of the hole. A series of such holes correspond to the holographic sub-tiles shown in FIGS. 2*a* to 2*h* and a series of masks corresponding to sub-holograms are shown in FIGS. 3*a* to 3*h*. The sub-hologram is a spatially sub-sampled version of a full hologram of the voxel 54, with the holographic tile topology determining the nature of the sub-sampling. Hence it is important to choose the number of holographic tiles and their layout across the holographic screen such that the voxel 54 would be visible from a variety of perspectives in order to be faithfully reconstructed. There are an infinite number of holographic tile topologies and sub-hologram configurations possible. The examples in FIGS. 2 and 3 are chosen for simplicity to illustrate the concept. Some alternative sub-hologram configurations are given in FIGS. 5*a* to 5*d* and 6*b*.

There are numerous prior art methods for constructing colour holograms described in the literature. Many of these methods are applicable to the construction of the holographic screen with sub-holograms. The preferred embodiment of the holographic screen and its sub-holograms is via colour reflection holograms where each voxel is white in colour and is composed of the three primary colours: red, green and blue. Reflection holograms have the advantage that they can be illuminated by ordinary light sources such as tungsten, halogen or metal halide lamps commonly found in projectors. The holographic screen may equally be implemented as a transmission hologram but it would then require illumination by coherent light sources such as colour laser-based projectors.

A simple colour extension of the monochromatic method described here is to make three H1 and H2 holograms using red, green and blue lasers respectively, using films sensitive to these colours. The three developed H2 reflection holograms are then stacked to make a final composite holographic screen with colour sub-holograms and voxels. The sub-hologram is illuminated with red, green and blue light sources with the same wavelengths as the lasers used to create the H2 holograms. In this manner, the recorded red, green and blue voxels are reconstructed in the same volume of space, thereby creating a white voxel. This white voxel can be used to recreate any colour visible to the human eye by varying the intensities of the constituent red, green and blue light sources.

An effective embodiment of the holographic screen would be to numerically compute the diffraction patterns for each sub-hologram and its corresponding voxel in 3D space. These patterns can then be printed directly on the surface of a suitable substrate such as silica, polymer or other holographic materials using embossing, lithographic or photo-reduction techniques. This method is effective for transmission holograms as the diffraction patterns only need to be printed on one surface whereas reflection holograms would require several layers.

Other methods for making the holographic screen include holographic printing technologies from companies like Geola, Spatial Imaging and Zebra Imaging. Holoprinters use a variety of techniques to produce multiplexed stereographic holograms from various sources including simulated 2D computer images, from multiple angles. The holograms produced in this manner are high quality full colour reflection holograms. The holographic screen may be produced by means of a holoprinter by interleaving a series of computer-generated voxels from a variety of perspectives and positions on to the holographic stereogram.

Depending on how they are recorded, the voxels can be made to appear in front, behind or on the holographic screen; or a combination of these. If the voxels are reconstructed in front of the holographic screen then the 3D image appears to be floating in mid-air; this is known as a real image. Otherwise, if the voxels are reconstructed behind the holographic screen then the 3D image would be encapsulated within the screen, rather like looking at the image through a window; this is known as a virtual image.

Projector and Display Panels

The colour digital projector is readily available as prior art. These projectors usually take an analogue or digital video signal as input and project an image on to a flat projection screen. These projectors use a bright light source, together with suitable optics and active components to project a two dimensional images on to a plain white or silvered projection screen. The light source is usually a metal halide lamp that produces bright light with good colour temperature characteristics and a broad spectrum. The internal optics usually consists of prisms, colour filters, dichroic mirrors and lenses. The most common active components are based on liquid-crystal technology (LCD panels or LCOS) or DLP technology based on digital micromirrors. Such projectors are suitable for illuminating reflection holograms. Other types of projectors such as laser projectors use similar optics and active components except that they do not require a separate lamp as these components are driven directly by primary colour lasers. Laser projectors are suitable for illuminating transmission holograms. Projectors usually incorporate fans for cooling the light source, hence this is the only moving part within the projection-based volumetric holographic display.

The size of the image produced by the projector has to be at least as large as the holographic screen. The resolution of the projector needs to produce the sub-holograms and holographic tiles with sufficient accuracy. As holograms reconstruct 3D images due to diffraction or Bragg reflection, only a small portion of the incident light energy is actually used to reconstruct the 3D image. Hence, it is important to use projectors or LCDs with high intensity light sources to reconstruct the voxels.

The projector required by the invention needs to be suitably modified to work with the holographic screen. For optimal colour reproduction, the primary colours used within the projector need to match the primary colours of the holographic screen. This means that the internal optics of the projector including colour filters, prisms or other dichroic components need to match the frequencies of the red, green and blue lasers that created the holographic screen. Most digital projectors include keystone correction feature which corrects the angular distortion of the projected image when the projector is angled with respect to the screen. The projector needs to be angled with respect to the holographic screen such that the angle of incidence matches the reference beams used to create the hologram. The projector needs to provide sufficient keystone correction for this angular distortion.

Figure 9:
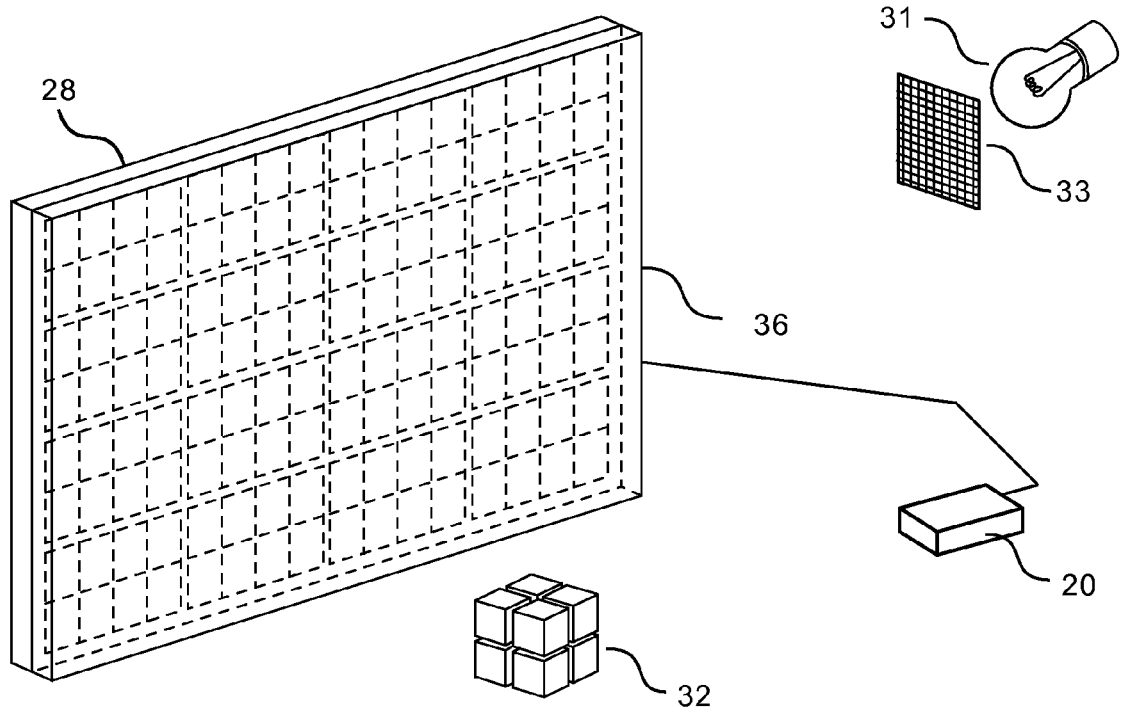
FIG. 9 shows a second embodiment using a LCD panel and a light source.

In the alternative embodiment given in FIG. 9, the colour LCD panel 36 is readily available as prior art. An LCD panel typically comprises an active matrix of TFTs on a glass substrate with transparent electrodes. For a colour LCD panel, there are three transistors per pixel with red, green and blue filters to produce colour. The other components of the LCD panel include the liquid crystal material sandwiched between a glass panel and the active matrix panel. When a TFT on the active matrix is activated, it produces a voltage across the liquid crystal material that changes the orientation of the liquid crystal, which changes the polarisation of any light passing through the liquid crystal. If the light incident on the TFT is also polarised then it will either be transmitted or blocked, depending on the orientation of the crystals. The display-based embodiments in FIGS. 9 and 9a have no moving parts.

In the embodiment of FIG. 9, the projector is replaced by a bright light source 31 with a polarising filter 33 that illuminates a LCD panel 36 which is placed in front of the holographic screen 28. The image pattern generation unit 20 drives the LCD panel 36 via a video interface. The LCD panel 36 acts as a mask or shutter for the polarised light source. The default configuration of the LCD panel is opaque so no polarised light reaches the holographic screen. The image pattern generation unit makes transparent colour patterns on the LCD panel that expose the underlying sub-holograms to the polarised light source that enable the voxels 32 to be reconstructed. The light source may be based on halogen or metal halide or other bright lamp technologies. The lamp and polarising filter needs to be angled with respect to the holographic screen such that the angle of incidence of the light matches the reference beams used to create the holographic screen. The size of the LCD panel has to be at least as large as the holographic screen. The resolution of the LCD panel has to produce the sub-holograms and holographic tiles with sufficient accuracy. The LCD panel needs to be configured such that the default state is opaque. This may be achieved by placing a polarising filter covering the LCD panel with the same polarisation as the polarising filter 31, such that the orientation of both polarisers is orthogonal to the polarisation of the liquid crystal. The red, green and blue filters on the LCD panel need to be adapted to match the red, green and blue lasers used to create the holographic screen.

Figure 9A:
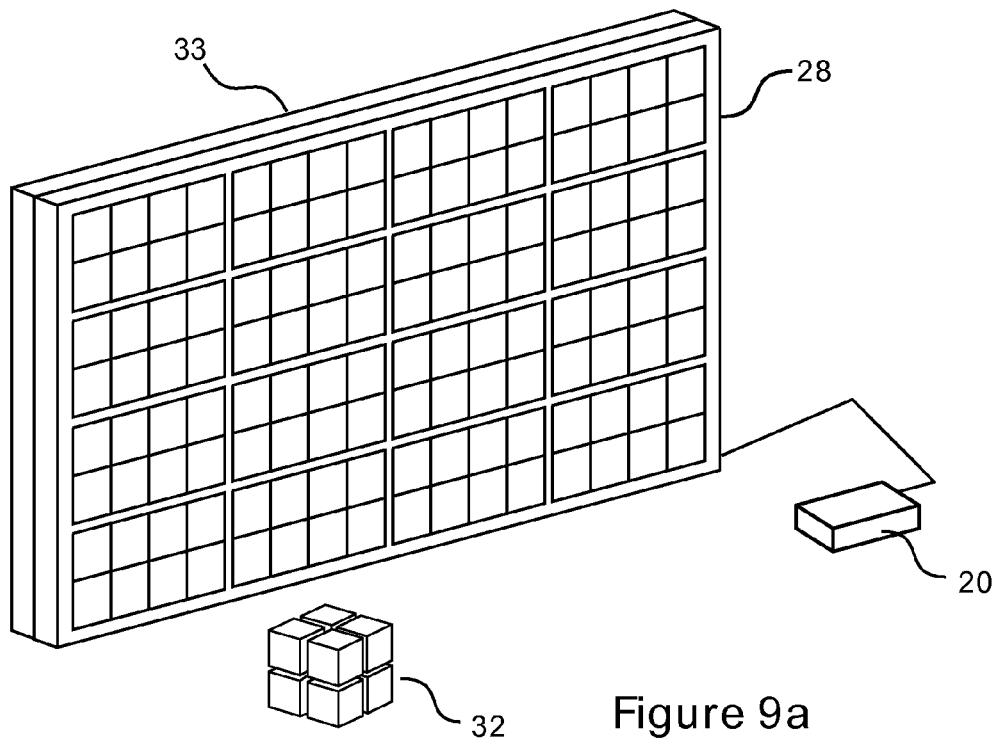
FIG. 9a shows another embodiment with a light emitting display panel.

An alternative embodiment is depicted in FIG. 9a, which is based on an emissive display panel 33 behind the holographic screen 28. The image pattern generation unit 20 is connected to the video input of the light emitting display. The configuration acts as a true programmable light source as any display panel element can emit light. The image pattern generation unit makes the sub-hologram patterns on the emissive display which directly illuminate the sub-holograms that enable the voxels 32 to be reconstructed. The size and resolution requirements of the light emitting display are similar to the LCD panel. The emissive display panel may be based on a CRT display, colour LED display, OLED (organic light-emitting diode) display, plasma display or a colour laser diode display. The frequencies of the primary colours of the emissive display panel need to match those of the holographic screen. The emissive display panel needs to be optically coupled to the holographic screen such that the angle of the incident light matches the reference beams used to create the holographic screen.

A simple all-mechanical embodiment of the invention could use a mechanical movie projector with a series of sub-hologram images pre-recorded on a film which together act as a programmable illumination means with a static set of patterns. This configuration enables a pre-recorded set of 3D images to be displayed.

The image pattern generation unit may be integrated within electronics of the displays device such as the projector, LCD panel or emissive display panel. The digital input 12 of the image pattern generation unit may be implemented as a network interface within the display device for receiving instructions, configuration information and voxels.

Scaling the Holographic Volumetric Display

Figure 10:
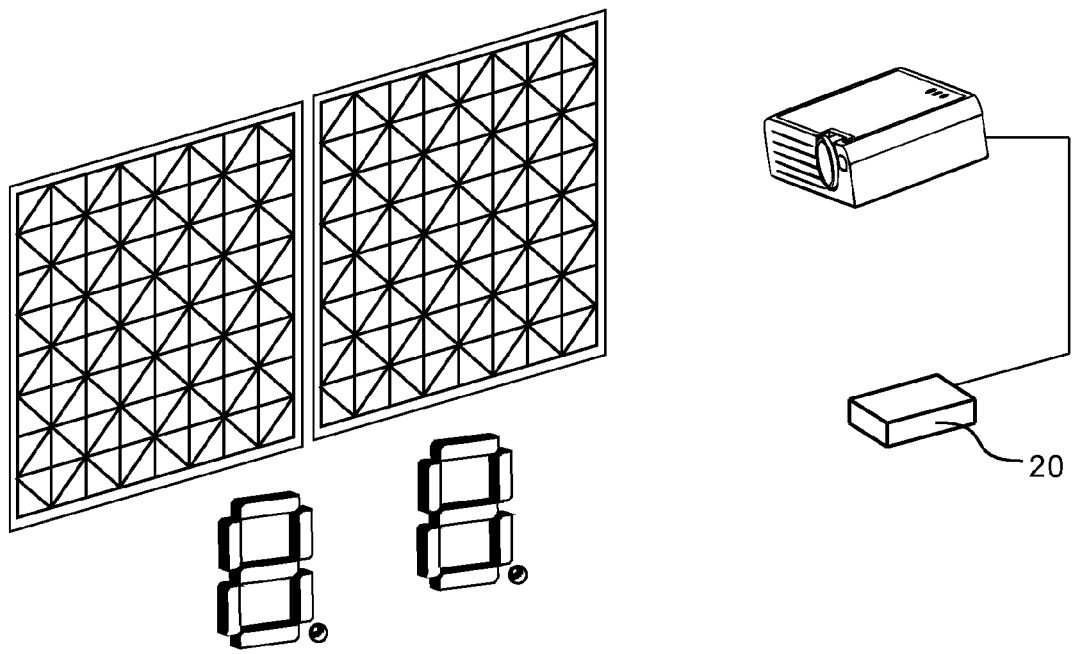
FIGS. 10 and 10a show how multiple holographic screens can be arranged to make larger 3D displays.

The holographic volumetric display may be scaled in several ways. The simplest method is shown FIG. 10 where two holographic screens are placed side by side. This example shows two instances of the segmented volumetric display from FIG. 6a and the holographic screen from FIG. 6b. The pair of holographic screens may be illuminated by the same projector with the image pattern generation unit suitably modified to take both screens into account. This includes mapping voxel co-ordinates across both holographic screens. In this manner, two or more different holographic screens may be stacked in the same plane to produce larger holographic volumetric displays.

Figure 10A:
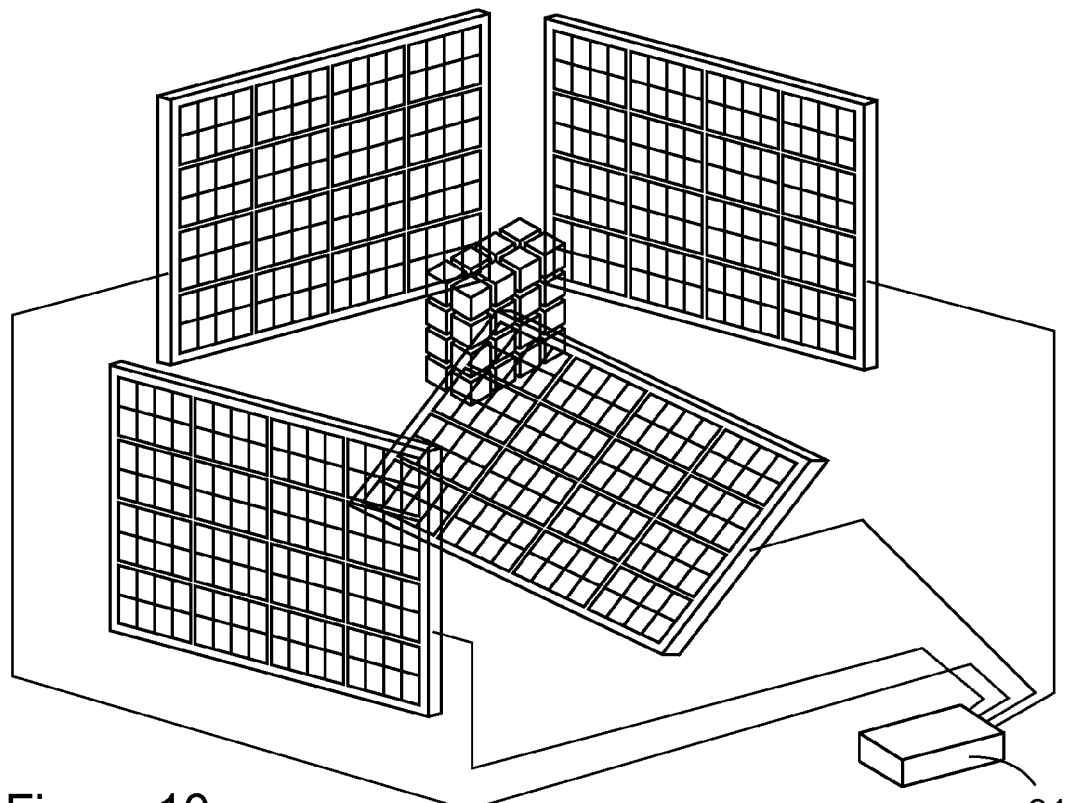

The holographic volumetric display may also be scaled in three dimensions by placing holographic screens as shown in FIG. 10a which depicts a 4×4×2 voxel display as an arrangement of four 2×2×2 displays. This example is based on the LCD panel embodiment of FIG. 9, with four separate panels, one for each holographic volumetric display. The arrangement also requires a polarised light source not shown in FIG. 10a. The modified image pattern generation unit 21 needs to take all holographic screens into account by including a driver to interface with four video connections and correctly applying voxel co-ordinates across the volumetric displays. In such a configuration, it would be advantageous to have the image pattern generation units integrated within the display device and to access all screens via a network interface from a host computer.

The holographic screen may be any planar shape of any size and the image pattern generation unit needs to know about the geometry of the holographic screen as well as the features of the display device. It is also possible to have holographic screens that are curved or even cylindrical. Such displays require projectors with adapted optics or additional signal processing to project the sub-hologram images on to the holographic screen.

The description of the holographic volumetric display has been given for illustrative purposes only. Numerous modifications and variations would be readily apparent to those skilled in the art, while still falling within the spirit and scope of the invention as claimed.

Glossary of Terms

API, Application Programming Interface
Bitmap, organisation of memory or files to represent graphical images
C or C++, programming languages
CGH, Computer Generated Hologram
CPU, Central Processing Unit
DLP, Digital Light Processing
DSP, Digital Signal Processing
FIFO, First-In-First-Out
Java, a high level programming language
LCD, Liquid Crystal Display
LCOS, Liquid Crystal on Silicon
LED, Light Emitting Diode
OLED, Organic LED Python, a high level programming language
RAM, Random Access Memory
SLM, Spatial Light Modulator
TFT, Thin Film Transistor
Volumetric display, a type of three dimensional display
Voxel, a single volume element in a volumetric display.

The invention claimed is:

1. An apparatus for a holographic volumetric display comprising a programmable patterned lighting device and a passive holographic screen, wherein said screen includes a representative matrix of holographic tiles, each tile having a set of holographic sub-tiles, and the screen further comprises a set of uniformly spatially sampled holographic interference pattern, or sub-holograms, which is spatially interleaved with other sub-holograms across the screen and stored within the same sub-tiles across the surface of the holographic screen, where each sub-hologram in the set of spatially sampled holographic interference patterns is capable of reconstructing a holographic volumetric element in three dimensional space outside the plane of the holographic screen when these respective sub-holograms are selectively illuminated by the programmable patterned lighting device illuminating the same sub-tile within each tile across the tiled array and other sub-holograms are capable of reconstructing different holographic volumetric element(s) in three dimensional space outside the plane of the holographic screen when those respective sub-holograms are selectively illuminated by the programmable patterned lighting device illuminating the respective same sub-tile within each tile across the tiled array.

2. The apparatus according to claim 1 including a multitude of holographic volumetric displays where multiple passive holographic screens are arranged to make larger composite holographic volumetric displays with multiple or shared programmable patterned lighting device.

3. The apparatus according to claim 1 wherein said screen comprises a colour holographic screen comprising interleaved or stacked red, green and blue holographic screens within the same sub-hologram positions such that their holographic voxels overlap spatially.

4. The apparatus according to claim 1 wherein the programmable patterned lighting device comprises an image pattern generation unit and a display unit.

5. The apparatus according to claim 4 wherein the image pattern generation unit comprises one or more of logic gates, a computational device, gate array device, memories and video output hardware.

6. The apparatus according to claim 4 wherein the image pattern generation unit is configured to receive control and configuration parameters including firmware, program code, sub-hologram descriptions, image patterns, holographic tile descriptions, holographic screen size, number of holographic screens, orientations of multiple holographic screens or image sequencing.

7. The apparatus according to claim 4 including a driver for an adapted image pattern generation unit that drives multiple display units to make larger holographic volumetric displays.

8. The apparatus according to claim 4 wherein the display unit comprises a digital projection unit, such as a digital colour projector or a laser projector.

9. The apparatus according to claim 4 wherein the display unit comprises a LCD panel together with a polarised light source.

10. The apparatus according to claim 4 for a modified display unit wherein the image pattern generation unit is integrated within the display unit.

11. The apparatus according to claim 1 wherein the holographic screen is configured to reconstruct any number of holographic voxels, where the holographic voxels may be of different arbitrary sizes and geometries, and the holographic voxels may be located in any arbitrary positions in three dimensional space outside the plane of the holographic screen within the boundaries of the manufacture of the holographic screen.

12. The apparatus according to claim 1 when the holographic screen is configured such as to make image segments, dot-matrix segments, alphanumeric segments, gauge segments, bar-graph segments, symbol segments or icon segments.

13. A method for constructing a passive holographic screen for use in creating a holographic volumetric display by use of a programmable patterned lighting device wherein said screen comprises a representative matrix of holographic tiles, each tile having a set of holographic sub-tiles, uniformly spatially sampling a holographic interference pattern, or sub-holograms, and recording on to a holographic material the sampled pattern or sub-holograms within the same sub-tiles across the surface of the holographic screen, where each sub-hologram in the set of spatially sampled holographic interference patterns is capable of reconstructing a holographic volumetric element in three dimensional space outside the plane of the holographic screen when these respective sub-holograms are selectively illuminated by the programmable patterned lighting device illuminating the same sub-tile within each tile across the tiled array and said sub holograms are interleaved with other sub-holograms recorded in other sub-tiles said other sub-holograms also being capable of reconstructing different holographic volumetric element(s) in three dimensional space outside the plane of the holographic screen when those respective sub-holograms are selectively illuminated by the programmable patterned lighting device illuminating the respective same sub-tile within each tile across the tiled array.

14. The method for constructing a passive holographic screen according to claim 13, wherein the holographic material is a holographic film or plate and the recording is by means of transfer image holography comprising the steps of: (a) making a master transmission hologram H1 of a voxel, (b) placing the master holographic voxel in different positions, (c) placing different sub-hologram masks for each holographic voxel position in front and behind the holographic film or plate, (d) recording the H1 voxel on to the masked H2 hologram.

15. The method for constructing a holographic screen according to claim 14 where the image additionally includes spatially overlapping holographic voxels.

16. The method for constructing a holographic screen according to claim 13 where the sub-holograms and holographic voxels are recorded on to a holographic material either by means of a holographic printer using a series of computer-generated voxels from a variety of perspectives to make a holographic stereogram or by means of numerically computing the interference pattern for all sub-holograms and their voxels, and transferring the patterns on to a silica, polymer or other holographic material by means of photolithography, embossing or photo-reduction techniques.

17. A method for creating a holographic volumetric display using the apparatus for a holographic volumetric display comprising a programmable patterned lighting device and a passive holographic screen, wherein said screen comprises a representative matrix of holographic tiles, each tile having a set of holographic sub-tiles, and the screen further comprises a set of uniformly spatially sampled holographic interference pattern, or sub-holograms, which is spatially interleaved with other sub-holograms across the screen and stored within the same sub-tiles across the surface of the holographic screen, where each sub-hologram in the set of spatially sampled holographic interference patterns is capable of reconstructing a holographic volumetric element in three dimensional space outside the plane of the holographic screen when these respective sub-holograms are selectively illuminated by the programmable patterned lighting device illuminating the same sub-tile within each tile across the tiled array and other sub-holograms are capable of reconstructing different holographic volumetric element(s) in three dimensional space outside the plane of the holographic screen when those respective sub-holograms are selectively illuminated by the programmable patterned lighting device illuminating the respective same sub-tile within each tile across the tiled array and wherein the programmable patterned lighting device comprises an image pattern generation unit and a display unit where the image pattern generation unit makes two dimensional patterns comprising the steps of:

(a) receiving a description of the 3D image;
(b) transforming each voxel coordinate into a 2D image pattern corresponding to the pattern of its sub-hologram and applying a voxel colour to each 2D image pattern;
(c) superimposing all 2D image patterns into a final image pattern; and
(d) outputting the final image pattern on the display unit.

* * * * *